United States Patent [19]

Osabe

[11] Patent Number: 5,121,238
[45] Date of Patent: Jun. 9, 1992

[54] LIQUID CRYSTAL DEVICE

[75] Inventor: Akio Osabe, Atsugi, Japan

[73] Assignee: Semiconductor Energy Laboratory Co., Ltd., Kanagawa, Japan

[21] Appl. No.: 421,502

[22] Filed: Oct. 11, 1989

[30] Foreign Application Priority Data

Oct. 17, 1988 [JP] Japan .................. 63-261969

[51] Int. Cl.⁵ .............................. G02F 1/13
[52] U.S. Cl. ............................ 359/73; 359/62; 359/63; 359/93; 359/104
[58] Field of Search ........... 350/339 R, 350 S, 350 R, 350/337, 347 E

[56] References Cited

U.S. PATENT DOCUMENTS

| 4,711,530 | 6/1990 | Nakanowatori et al. | 350/339 R |
| 5,033,825 | 7/1991 | Ishikawa et al. | 350/350 S |

FOREIGN PATENT DOCUMENTS

| 234224 | 9/1988 | Japan | 350/350 R |
| 323231 | 7/1989 | United Kingdom | 350/350 R |

*Primary Examiner*—Rolf Hille
*Assistant Examiner*—Tan Ho
*Attorney, Agent, or Firm*—Sixbey, Friedman, Leedom & Ferguson

[57] ABSTRACT

A liquid crystal display wherein chromatic aberration is reduced by superimposing an anisotropic film on a ferroelectric liquid crystal where the anisotropic film is located between a pair of polarizing plates and is selected from the group consisting of polycarbonates, polyvinylalcohol, polyacetates, polyethylene, polyester, polyimides, polyamides, polyvinylchloride, and polystyrene.

4 Claims, 1 Drawing Sheet

LIQUID CRYSTAL DEVICE

BACKGROUND OF THE INVENTION

The present invention relates to a ferroelectric liquid crystal display.

Recently, ferroelectric liquid crystal materials have attracted interests of researchers in the display fields since there is possibility by use of this kind of liquid crystal materials to realize non-volatile and low-power-consumption displays. Briefly described, a liquid crystal device of this kind is composed of a ferroelectric liquid crystal layer sandwiched between and supported by a pair of polarizing plates whose polarization plates are aligned normal to each other. The display operation is based on the birefringence of the liquid crystal material of this kind. The liquid crystal layer has different refractive indices in perpendicular directions parallel to which the polarizing plates are respectively aligned. The contrast ratio and the color tone of the display of this kind depend mainly upon the retardation thereof. The retardation is defined as the product of the thickness of the liquid crystal layer and the differential refractive index between the different indices.

The retardation corresponds to the rotation of the polarization plane of light passing through the liquid crystal layer. The differential refractive indices of ferroelectric liquid crystal materials are limited to a range of about from 0.12 to 0.20 in order to maintain other characteristics such as spontaneous polarizations, viscosity coefficients, transition temperatures and so on. In this case, the thickness of the liquid crystal material must be as small as one micrometer in order to avoid chromatic aberration. Otherwise, the image constructed by the display become unsightly because of undesirable yellowish colors. In order to form a liquid crystal layer having such a small thickness of this order, two substrates have to be located so close to each other to constitute a space of one micrometer thickness. This severe configuration substantially increases the likelihood of formation for short current paths therebetween, and therefore decreases the yield.

SUMMARY OF THE INVENTION

It is therefore an object of the present invention to provide a liquid crystal display which can be manufactured at a high yield.

It is another object of the present invention to provide a liquid crystal display which can construct white-black images at a high contrast ratio.

When a linearly polarized light ray enters an anisotropic ferroelectric liquid crystal layer having different refractive indices in normal directions perpendicular and parallel to the long axes of the liquid crystal molecules, the direction of polarization rotates in the layer as long as the polarization plane is oblique to the normal directions. The phase difference D between two components of an incident light in the normal directions is given by $$D = d \times dn \times 2\pi/\lambda$$

where d is the thickness of the liquid crystal layer; dn is the differential index between the two refractive indices; and $\lambda$ is the wavelength. The effect of the anisotropy of the medium becomes maximum when the phase difference D is $\pi(2n-1)$ wherein n is an integer. Since the chromatic aberration increases as the D increase, the D has to be $\pi$. On the other hand, in case of ferroelectric liquid crystal material having been prepared by mixing several liquid crystals to conform necessary characteristics the thickness has to be as thin as 1.5 micrometers or less. The yield of devices having such a thin liquid crystal layer becomes very low because of the increase likelihood of the formation of short current paths between pair of electrodes sandwiching the liquid crystal layer.

A liquid crystal device comprises a pair of transparent substrates insides of which are formed with electrode arrangements, a ferroelectric a liquid crystal layer between the substrates and a pair of polarizing plates arranged orthogonally in the outsides of the substrates. In accordance with the present invention, the thickness of a liquid crystal layer is chosen to be sufficiently large suitable for manufacture, e.g., from 2 micrometers to 5 micrometers, so that the liquid crystal device can be easily manufactured at an increased yield. The excess phase difference due to the increased thickness is cancelled out by disposing between the polarizing plates an anisotropic film. The film may be a high polymer film having been elongated in one direction to possess a birefringence property. The thickness of the anisotropic film is selected so that the total phase difference of the liquid crystal layer and the anisotropic film is from 2.0 to 3.14 preferably with respect to visual light.

BRIEF DESCRIPTION OF THE DRAWINGS

This invention can be better understood from the following detailed description when read in conjunction with the drawing in which.

DETAILED DESCRIPTION OF THE PREFERRED EMBODIMENT

Figure 1:
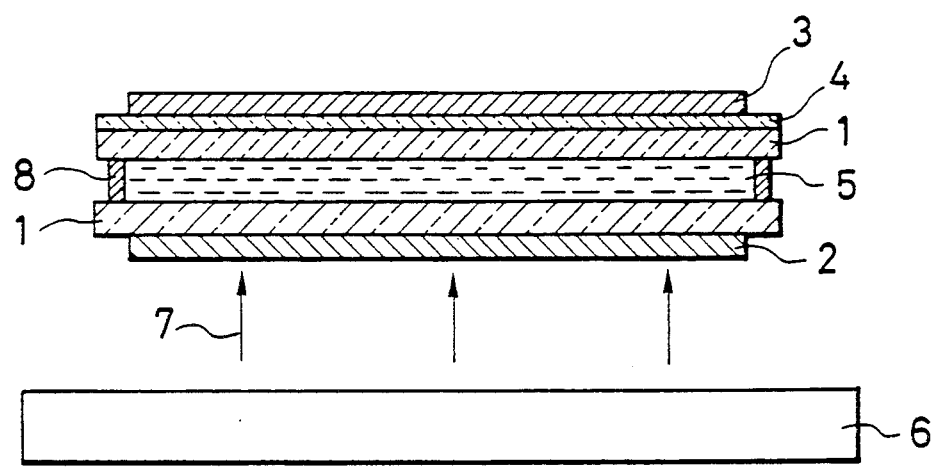
FIG. 1 is a cross-sectional schematic showing a liquid crystal display in accordance with the present invention.

Referring now to FIG. 1, a liquid crystal display in accordance with the present invention is schematically illustrated. The display comprises a pair of glass substrates 1 and 1 and whose opposite insides electrode arrangements are formed in order to define a plurality of pixels therebetween, a blended ferroelectric liquid crystal layer 5 between the substrates, a high polymer film 4 and a pair of polarizing plates arranged perpendicular to each other. The high polymer film has been elongated in one direction in order to be anisotropic. The differential refractive index of the polymer film can be controlled by adjusting the degree of the elongation. The polymer film is composed of for example polycarbonates, polyvinylalcohol, polyacetates, polyethylene, polyester, polyimides, polyamides, polyvinylchloride, polystyrene and so forth. The liquid crystal layer has been disposed between the substrates in order to possess bistability of its molecular alignment in terms of anisotropy. Numeral 6 designates a light source for illuminating the liquid crystal device from the back surface thereof. The polarizing direction of the polarizing plate 2 is normal to the plane of the drawing sheet. The liquid crystal layer has been aligned to have the long axes of its molecules normal to the plane of the drawing sheet in one of its bistable conditions. The polarizing direction of the polarizing plate 3 is parallel to the drawing sheet. In this condition, since the polarized light is not modified by the liquid crystal layer, the light can not pass through the polarizing plate 3 and the view of the front side of the liquid crystal display becomes dark or black.

When an appropriate electric field is applied to the liquid crystal layer at selected pixels by means of the electrode arrangements, conical motion of the liquid crystal molecules at the pixels occurs in order to change the molecular condition to the other of the bistable conditions and the polarizing plane of the light ray passing therethrough rotates. The rotation is the product of the thickness of the layer and the differential refractive index between the directions parallel and perpendicular to the long axes of the moleculars. The phase difference between light ray polarized in the two directions can be calculated as the product of the retardation, $2\pi$ and the inverse number of the wavelength. The differential index of the liquid crystal layer is for example 0.15 and the thickness thereof is for example 3 micrometers. Then, the phase difference caused by the liquid crystal layer is calculated to be 5.1 with respect to light of 550 namometers wavelength. The phase difference is reduced to be 2.0 by virtue of the anisotropic polymer film. Ideally, the polarized light passing through the polarizing plate 2 rotates by 180° and fully passes through the other polarizing plate 3 when the phase difference is $\pi$ i.e. approximately 3.14. In this case, however, chromatic aberration deteriorates the quality of display. The number of 2.0 is a compromise. The alignment of the anisotropic axis of the polymer film is determined in the following manner.

The polarizing direction of the polarizing plate 2 is adjusted in parallel with the long axis of the liquid crystal molecules in one condition in which the incident light is not modified by the liquid crystal layer since it propagates in accordance with the refractive index along the long axes. In the other condition in which the long axes of the liquid crystal molecules become oblique to the polarizing direction, the light is separated into two components, one propagating in accordance with the refractive index along the long axis and the other in accordance with the refractive index perpendicular to the long axis. The refractive index of the liquid crystal along the long axis is larger than that perpendicular to the long axis. Thence, the polymer film has to be aligned so that the refractive index thereof perpendicular to the long axis is larger than that along the long axis in case when the liquid crystal layer is in the other condition. The thickness of the polymer film is chosen to be for example about 9 micrometers in case that the differential refractive index thereof is about 0.03. By adjusting the thickness of the film, i.e., the retardation, the images constructed by the display can be colored slightly if desired.

While several embodiments have been specifically described by way of examples, it is to be appreciated that the present invention is not limited to the particular examples described and that modifications and variations can be made without departing from the scope of the invention as defined by the appended claims. Some examples are as follows.

Although the above example is of the transmissive liquid crystal device type, the present invention can be applied also to the reflection type device. In either case, the polymer film can be located in either side of the liquid crystal device as long as it is located between a pair of polarizing plates.

What is claimed is:

1. A liquid crystal device comprising:
   (a) a liquid crystal cell comprising:
   a pair of substrates at least one of which is transparent;
   a ferroelectric liquid crystal layer disposed between said substrates; and
   an electrode arrangement formed on the inside surfaces of said substrates in order to apply an electric field to said liquid crystal layer;
   (b) a pair of polarizing plates disposed on both sides of said liquid crystal cell; and
   (c) at least one anisotropic film disposed between at least one of the polarizing plates and said liquid crystal cell, wherein said anisotropic film comprises polycarbonate.

2. The display of claim 1 wherein said anisotropic film is a polymer film which have been elongated in one direction in order to possess a birefringence property.

3. The display of claim 1 wherein said thickness of said liquid crystal layer is from 2 micrometers to 5 micrometers.

4. The display of claim 1 wherein the total phase difference of said liquid crystal layer and said anisotropic film is from 2.0 to 3.14 with respect to visual light.

* * * * *